(12) United States Patent
Berger et al.

(10) Patent No.: US 9,088,835 B2
(45) Date of Patent: Jul. 21, 2015

(54) METHOD FOR ADJUSTING DEPTH OR VIEW OF THREE-DIMENSIONAL STREAMING VIDEO

(75) Inventors: Gad Moshe Berger, Dayton, NJ (US); David Brian Anderson, Hamilton, NJ (US); Alan Jay Stein, Princeton Junction, NJ (US)

(73) Assignee: THOMSON LICENSING, Issy les Moulineaux (FR)

( * ) Notice: Subject to any disclaimer, the term of this patent is extended or adjusted under 35 U.S.C. 154(b) by 355 days.

(21) Appl. No.: 13/315,355

(22) Filed: Dec. 9, 2011

(65) Prior Publication Data

US 2012/0320154 A1    Dec. 20, 2012

Related U.S. Application Data

(60) Provisional application No. 61/424,129, filed on Dec. 17, 2010.

(51) Int. Cl.
*H04N 13/00* (2006.01)
*H04N 21/845* (2011.01)

(52) U.S. Cl.
CPC ......... *H04N 21/845* (2013.01); *H04N 13/0011* (2013.01); *H04N 13/0022* (2013.01); *H04N 13/0059* (2013.01); *H04N 2213/003* (2013.01)

(58) Field of Classification Search
CPC ...... H04N 13/0011; G09G 5/00; G06T 15/10; G06K 9/00
See application file for complete search history.

(56) References Cited

U.S. PATENT DOCUMENTS

| | | | |
|---|---|---|---|
| 6,771,303 B2 | 8/2004 | Zhang et al. | |
| 7,136,415 B2 * | 11/2006 | Yun et al. | 375/240.26 |
| 7,224,357 B2 | 5/2007 | Chen et al. | |
| 7,720,282 B2 | 5/2010 | Blake et al. | |
| 2005/0190180 A1 * | 9/2005 | Jin et al. | 345/419 |
| 2007/0081716 A1 * | 4/2007 | Ha et al. | 382/154 |
| 2010/0232510 A1 * | 9/2010 | Ho et al. | 375/240.16 |
| 2012/0229604 A1 * | 9/2012 | Boyce et al. | 348/43 |

* cited by examiner

*Primary Examiner* — Sath V Perungavoor
*Assistant Examiner* — Janese Duley
(74) *Attorney, Agent, or Firm* — Robert D. Shedd; Jeffrey M. Navon

(57) ABSTRACT

A system and method for adjusting the depth or view of three dimensional (3D) images in streaming video is provided. The invention enables the 3D streaming video client to change among different 3D disparities without any knowledge of the disparity maps or requiring any image processing at the client. Multiple versions of the video sequence are pre-encoded with each version representing a different disparity. The disparity of the 3D image may be changed on-the-fly to a selected rendering of a particular disparity. The 3D video player may switch among disparities seamlessly during playback.

20 Claims, 3 Drawing Sheets

```
[manifest]
names=view1,view2,view3,view4
units=kbps
bitrate=10000
start=1
end=30
chunk_time_ms=500
```

Figure 4

METHOD FOR ADJUSTING DEPTH OR VIEW OF THREE-DIMENSIONAL STREAMING VIDEO

CROSS REFERENCE TO RELATED APPLICATIONS

This application claims the benefit of U.S. provisional application No. 61/424,129 filed Dec. 17, 2010, the content of which is hereby incorporated by reference herein as if fully set forth.

FIELD OF INVENTION

This application is related to three-dimensional (3D) image processing and in particular to adjusting 3D disparities in the image at a server side.

BACKGROUND

In one three-dimensional (3D) solution for adjusting disparity in an image, a slider on a handheld game device is used to directly change the 3D disparity of the images on the liquid crystal display (LCD). This solution does not require glasses as the device may use parallax barrier technology. While this technology may work well in a small form factor with close viewing distances, it does not scale well to larger screen like televisions with longer viewing distances.

Another solution, usable on a game platform, allows the user to change the 3D disparity to best fit the user's preference. Since the game graphics are generated on the platform as game play occurs, it is possible to change the 3D disparities without transmitting any metadata from an external source. This is an advantage that 3D generated content has when it is rendered directly by the game platform. However, this is not the case with movies and television content as that content is rendered and encoded before it reaches its intended viewing platform.

SUMMARY

Described herein is a system and method for adjusting the depth or view of video images during three-dimensional (3D) streaming. The user may change among different 3D disparities without any knowledge of the disparity maps or requiring any image processing at the user end. Multiple versions of the video sequence are pre-encoded with each version representing a different disparity. The disparity of the 3D image may be changed on-the-fly to enable a selective rendering at a particular disparity. The 3D video player may switch among disparities seamlessly during playback giving the appearance of disparity changes that are nominally being done by the 3D video player.

BRIEF DESCRIPTION OF THE DRAWINGS

FIG. 4 is an example of a manifest file utilized in the example of FIG. 3.

DETAILED DESCRIPTION

It is to be understood that the figures and descriptions of embodiments have been simplified to illustrate elements that are relevant for a clear understanding of the invention, while eliminating other elements and steps that are well known in the art and do not facilitate a better understanding of the present invention.

Described herein is a system and method that employs adaptive streaming to change or adjust three-dimensional (3D) disparities of a video sequence that is transmitted by a video streaming service. In general, a video sequence is encoded multiple times with different 3D disparities. A client that connects to the video streaming service can switch among different 3D disparities while the stream is playing. This is useful with video on demand services and bypasses the need to send the disparity maps with the video since the different depths or views are encoded offline. As a result, the client does not need to worry about the available bandwidth but can still seamlessly switch between disparities at chunk boundaries as described herein below. The adjustable 3D technique is user driven.

Figure 1:
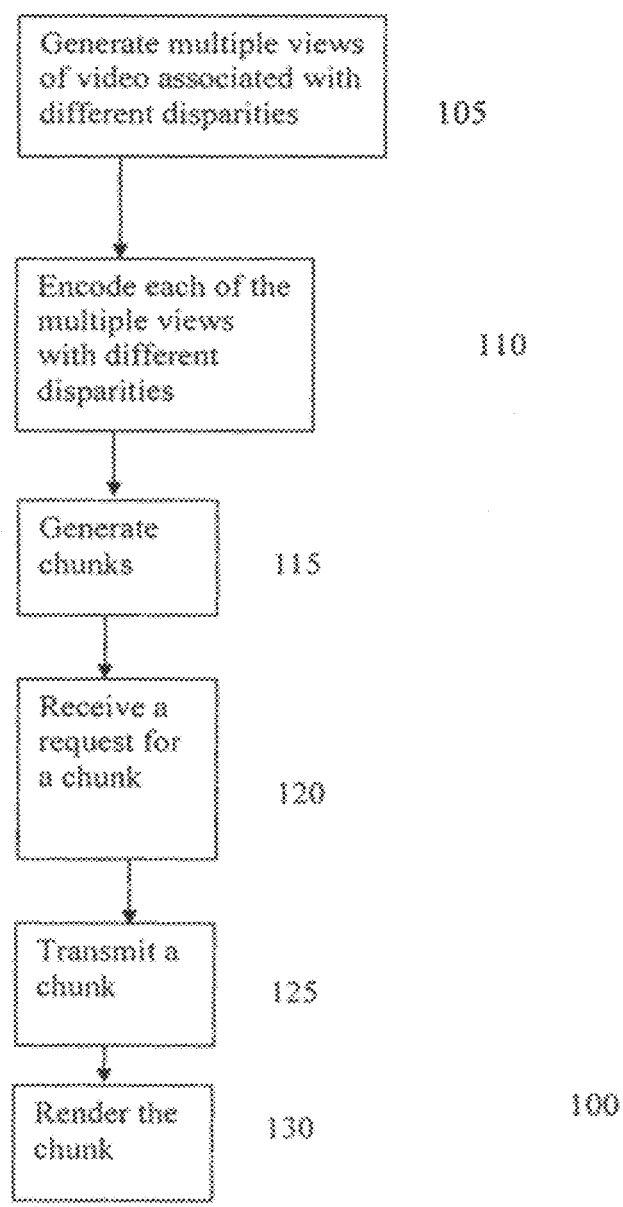
FIG. 1 is an illustrative flowchart for creating a three dimensional (3D) streaming video.

FIG. 1 is an illustrative flowchart 100 for adjusting depth or view of three dimensional (3D) streaming video. In general, multiple stereoscopic 3D views of video content are generated and then each is encoded with a disparity level. The disparity encoded content is then transmitted to a 3D player and rendered.

Initially, video may be generated with multiple stereoscopic 3D views (105). The stereoscopic 3D views can be generated either by making use of available disparity maps, recording content with multiple cameras or by interpolating or extrapolating new views from a particular view, as non-limiting examples. Other methods for generating multiple stereoscopic 3D views may be used.

Each stereoscopic 3D view may be encoded with a specified disparity level (110) and split into segments called chunks (115). Each chunk represents a number of frames that can be equal to a fraction of a second or multiple seconds of video. For each chunk, the corresponding chunks in other views are of equal length in frames, share the same encoding structure and the first frame in each chunk is a key frame. This means that the chunks are GOP-aligned across encodings, where GOP is a Group of Pictures (GOP) in block-based video coding.

A client may request a particular chunk having a particular disparity level or map (120). This chuck is transmitted to the client side (125) and rendered on a display (130).

Figure 2:
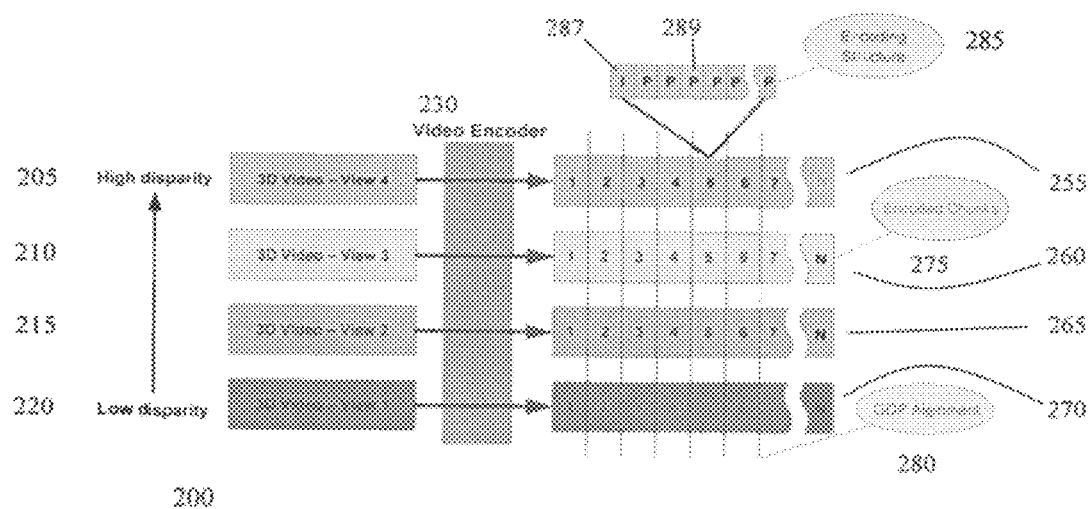
FIG. 2 illustrates the encoding of multiple views into equally segmented video chunks.

FIG. 2 is a block diagram 200 of encoding multiple views into equally segmented video chunks. In this example, there are four views 205, 210, 215 and 220 of the same video sequence. Each view 205, 210, 215 and 220 is encoded with a different 3D disparity using a video encoder 230. The different views range from less to more disparity to allow for increasing or decreasing the disparity at the client. The multiple views can also represent different resolutions or bit rates.

Each encoded view 255, 260, 265 and 270 has an equal number of chunks 275 and every chunk 275 is GOP-aligned 280. A blow-out view 285 of chunk 5 shows a simple GOP structure starting with an I-frame 287 followed by P-frames 289. The complexity of the encoding structure can be adjusted to suit the complexity of the scene for that chunk. The other GOP-aligned chunks should contain the same GOP structure if the bit rate and the resolution are constant across encodings. However, if the encodings represent a change in resolution or bit rate, the encoding structure may change. The only requirement then is that the number of frames for that chunk across views is constant and that each chunk starts with a key frame, adhering to the GOP-aligned nature of the encoding. Encoded hunks 275 within a single encoded view may be of different size. For instance, odd or irrational frame rates might require alternating chunks of even and odd frames. However, the corresponding encoded views need to be GOP-aligned.

Figure 3:
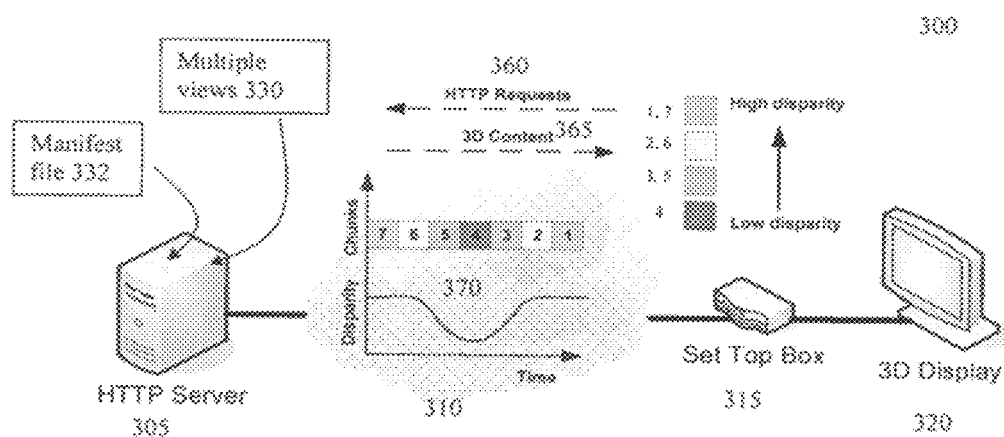
FIG. 3 illustrates distribution of a stereoscopic 3D video with four disparities where a set top box requests chunks from an HTTP server.

FIG. 3 illustrates a system 300 for distribution of stereoscopic 3D video with four disparities. For example, the system 300 may be a video on demand system where a video is hosted on an Internet connected server. The system 300 includes a HTTP server 305) that is connected via the Internet 310 to a set top box 315) that is connected to a 3D display 320.

Multiple disparity encoded views 330 and manifest file 332, which describes the characteristics of the encoding, are stored on the HTTP server 305. With reference to FIG. 4, there is shown an exemplary manifest file 400. The manifest file 400 starts with '[manifest]' identifier 405. The names field 410 describes the prefix of the file name of each view. The units 415 and the bitrate 420 describe the bit rate used to encode the sequences. In this example, the bitrate is 10 Mbps or 10,000 kilobits per second. The start field 425 and end field 430 describe the numbers of the first and last chunk. The chunk_time_ms field 435 describes the length of each chunk in milliseconds. In this example, the chuck_time_ms is 500 milliseconds or half a second; the manifest file 400 describes four views encoded at 10 megabits per second (Mbps); and, there are 30 chunks with each chunk representing 500 milliseconds.

With reference to FIG. 3, a client, such as set top box 315, may send HTTP requests 360 to the HTTP server 305. The client/set top box 315 may request disparities from high to low and low to high, as identified by chunks 1 through 7. Although the example describes the HTTP protocol, other forms of distribution can be used such as the real-time streaming protocol (RTSP). Since various streaming protocol uses different methods of encapsulation and signaling, the encoded files and manifest file may differ for each streaming protocol. One such example is the use of the MP4 file format for encapsulation for RTP/RTSP streaming. In that case, the manifest file is replaced by a Session Description Protocol (SDP) file.

The client/set top box 315 downloads the manifest file 332 from the server 305 and recreates the filename for each chunk based on the fields within it. In this example, each chunk is encoded as a separate H.264 stream that is encapsulated in an MPEG-2 Transport Stream. Hence, the first chunk in view 1 is 'view1_10000kbps_1.ts' and the last chunk in view 1 is 'view1_10000kbps_30.ts'.

With the ability to generate the file names for each chunk, the client/set top box 315 makes an HTTP GET request for the first chunk. The chunk is downloaded 365, decoded and rendered on display 320. The chunks are monotonically requested and rendered as to maintain temporal conformance. When a user of the set top box 315 requests a different view, instead of the chunk that follows the previously rendered chunk, the next chunk for the requested different view is transmitted. Because the chunks are GOP-aligned and begin with a key frame, the video continues to play seamlessly with the disparity being the only visible difference between the last chunk and the current chunk.

FIG. 3 shows the first seven chunks (1 . . . 7) of a video being retrieved by the set top box 315. Every chunk retrieved may have a different disparity and a graph 370 below the numbered chunks shows how the disparity changes over time from high to low and back to high again. This is akin to a user rapidly changing disparities at the client side.

While embodiments of the invention have been described, it will be appreciated that modifications of these embodiments are within the true spirit and scope of the invention. The invention is not limited to any particular element(s) that perform(s) any particular function(s) and some may not necessarily occur in the order shown. For example, in some cases two or more method steps may occur in a different order or simultaneously. Although illustrated in the context of separate functional elements, these functional elements may be embodied in one, or more, integrated circuits (ICs). Similarly, although shown as separate elements, any or all of the elements may be implemented in a stored-program-controlled processor, e.g., a digital signal processor, which executes associated software, e.g., corresponding to one, or more, of the functions. These and other variations of the methods disclosed herein will be readily apparent, especially in view of the description of the method described herein, and are considered to be within the full scope of the invention.

The invention claimed is:

1. A method for viewing video content at a client, comprising:
   generating multiple views of the video content, each view having an associated disparity level;
   encoding each of the multiple views with the respective associated disparity level;
   dividing each disparity encoded view into particular segments;
   receiving requests from the client for particular segments from each of the disparity encoded views, wherein some of the requested particular segments have different disparity levels; and
   transmitting a video generated from the requested particular segments of each of the disparity encoded views to the client, the disparity level being switched at boundaries between requested particular segments having different disparity levels.

2. The method of claim 1, wherein each view has an equal number of segments.

3. The method of claim 1, wherein each segment is a number of frames and the number of frames for each corresponding segment is of equal length.

4. The method of claim 1, wherein corresponding segments for the multiple views use same encoding scheme.

5. The method of claim 1, wherein a first frame in each segment is a key frame.

6. The method of claim 1, wherein the segments are group of pictures aligned across the multiple views.

7. The method of claim 1, wherein the view is a stereoscopic three dimensional (3D) view and the disparity levels are 3D disparity levels.

8. A system for creating 3D streaming video for transmission to a client, comprising:
   a server configured to generate multiple views of a video signal, and encode each view with an associated disparity level;
   the server configured to divide each disparity encoded view into particular segments;
   the server configured to receive requests from a client for particular segments from each of the disparity encoded views, wherein some of the requested particular segments have different disparity levels; and
   the server configured to transmit a video generated from the requested particular segments of each of the disparity encoded views to the client, the disparity level being switched at boundaries between requested particular segments having different disparity levels.

9. The system of claim 8, wherein each view has an equal number of segments.

10. The system of claim 8, wherein each segment is a number of frames and the number of frames for each corresponding segment is of equal length.

11. The system of claim 8, wherein corresponding segments for the multiple views use same encoding scheme.

12. The system of claim 8, wherein a first frame in each segment is a key frame.

13. The system of claim 8, wherein the segments are group of pictures aligned across the multiple views.

14. The system of claim 8, wherein the view is a stereoscopic three dimensional (3D) view and the disparity levels are 3D disparity levels.

15. A server for streaming video, comprising:
the server configured to generate multiple views of the video, each view having an associated disparity level;
the server configured to encode each of the multiple views with the associated disparity level;
the server configured to divide each disparity encoded view into particular segments;
the server configured to receive requests for particular segments from each of the disparity encoded views, wherein some of the requested particular segments have different disparity levels; and
the server configured to transmit a video generated from the requested particular segments of each of the disparity encoded views to the client, the disparity level being switched at boundaries between requested particular segments having different disparity levels.

16. The server of claim 15, wherein each view has an equal number of segments.

17. The server of claim 15, wherein each segment is a number of frames and the number of frames for each corresponding segment is of equal length.

18. The server of claim 15, wherein corresponding segments for the multiple views use same encoding scheme.

19. The server of claim 15, wherein a first frame in each segment is a key frame.

20. The server of claim 15, wherein the segments are group of pictures aligned across the multiple views.

* * * * *